3,174,982
Δ¹²-13,17-SECO-ANDROSTENE COMPOUNDS AND LACTONE INTERMEDIATES THEREFOR
Patrick A. Diassi, Westfield, and Allen I. Laskin, Somerset, N.J., assignors to Olin Mathieson Chemical Corporation, New York, N.Y., a corporation of Virginia
No Drawing. Filed Jan. 11, 1962, Ser. No. 165,657
8 Claims. (Cl. 260—343.2)

This invention relates to the synthesis of new steroids and derivatives thereof, and more particularly to the preparation of new testololactones and seco-androstatrienoic acids.

The final compounds of this invention are of the general formula

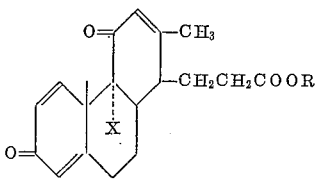

wherein X is hydrogen, chloro or fluoro (preferably hydrogen or fluoro), and R is hydrogen or a hydrocarbon radical of less than ten carbon atoms, as exemplified by lower alkyl (e.g., methyl, ethyl, propyl, butyl, hexyl and octyl), monocyclic ar(lower alkyl) (e.g., benzyl, phenethyl, 3-phenylpropyl, 4-phenylbutyl, and o, m, or p-tolylethyl), monocyclic aryl, cycloalkyl, cycloalkenyl, cycloalkyl(lower alky), lower alkenyl, and monocyclic ar-(lower alkenyl).

The final compounds of this invention, wherein R is hydrogen, can be obtained directly by culturing *Cylindrocarpon radicicola* in the presence of either 11-ketoprogesterone or a 9α-halo-11-ketoprogesterone, whereby a mixture of the desired final product and either 11-keto-1-dehydrotestololactone or 9α-fluoro (or chloro)-11-keto-1-dehydrotestololactone is produced; or indirectly from said 1-dehydrotestololactones by treatment of the latter with a base.

The method of culturing *Cylindrocarpon radicicola* for the purpose of this invention is the same as that described in U.S. Patent No. 2,868,694, except that either 11-ketoprogesterone or a 9α-halo-11-ketoprogesterone is employed as the steroid substrate. That is, the steroid is added to a growing culture of *Cylindrocarpon radicicola* either during the incubation period or by including it in the nutrient medium prior to inoculation. If 11-ketoprogesterone, 9α-iodo-11-ketoprogesterone, or 9α-bromo-11-ketoprogesterone is employed as the substrate, $\Delta^{1,4,12}$-13,17-seco-androstatriene-3,11-dione-17-oic acid is obtained as the product. If, however, 9α-fluoro-11-ketoprogesterone is used as the substrate, 9α-fluoro-$\Delta^{1,4,12}$-13,-17-seco-androstatriene-3,11-dione-17-oic acid is obtained; and 9α-chloro-11-ketoprogesterone yields 9α-chloro-$\Delta^{1,4,12}$-13,17-seco-androstatriene-3,11-dione-17-oic acid.

These free acids can then be converted to their ester derivatives in the usual manner, as by treatment with a desired alcohol in the presence of an esterification catalyst or, if a lower alkyl ester is desired, by treatment with a diazo(lower alkane), such as diazomethane.

The final compounds of this invention are physiologically active substances which possess protein-anabolic activity, and hence can be used in lieu of known protein-anabolic steroids, and may be administered either perorally or parenterally in the treatment of post-operative shock and other conditions where tissue degeneration has occurred, being formulated for such administration in the same type of preparations as testosterone, for example, with concentration and/or dosage based on the activity of the particular compound.

As stated hereinbefore, in addition to the seco-androstatrienoic acids, the process of this invention employing *Cylindrocarpon radicicola* as the microorganism yields 11-keto-1-dehydrotestololactone, 9α-chloro-11-keto-1-dehydrotestololactone, or 9α-fluoro-11-keto-1-dehydrotestololactone, depending on whether the steroid substrate is 11-ketoprogesterone (or 9α-iodo-11-ketoprogesterone or 9α-bromo-11-ketoprogesterone), 9α-chloro-11-ketoprogesterone, or 9α-fluoro-11-ketoprogesterone, respectively.

These 11-keto-1-dehydrotestololactones are new compounds of this invention which may be converted to the final products of this invention by treatment with a strong base, such as an alkali metal hydroxide (e.g., potassium hydroxide and sodium hydroxide). The reaction is preferably conducted at an elevated temperature.

The 11-keto-1-dehydrotestololactone intermediates of this invention can also be prepared by a two-step process of this invention. In the first step, 11-ketoprogesterone, 9α-chloro-11-ketoprogesterone or 9α-fluoro-11-ketoprogesterone is subjected to the action of *Penicillium citrinum*, whereby 11-ketotestololactone, 9α-chloro-11-ketotestololactone, and 9α-fluoro-11-ketotestololactone are formed, respectively. These 11-ketotestololactones are new intermediates of this invention.

The conversion is effected by either bringing together, in an aqueous medium, the steroid, oxygen, and enzymes of non-proliferating cells of *Penicillium citrinum* or, preferably, by including the steroid in an aerated culture of *Penicillium citrinum*.

When aerated culture is used, the oxidation is effected in the presence of *Penicillium citrinum* by adding the steroid to the culture during the incubation period, or by including it in the nutrient medium prior to inoculation. In any case, assimilable sources of nitrogenous materials for growth promotion and carbon-containing substances as energy sources should be present in the culture medium. Also, an adequate air supply should be maintained during the oxidation, e.g., by the conventional techniques of (1) exposing a large surface of the medium to air or (2) aerating in submerged culture.

In general, the conditions of culturing *Penicillium citrinum* for the purpose of this invention are (except for the inclusion of the steroid) the same as those of culturing such microorganism for the production of other metabolites. Thus, the nutrient medium essentially comprises assimilable sources of nitrogen for growth and carbon for energy.

The nitrogen source materials may be organic (e.g., soybean meal, cornsteep liquor, meat extract, and/or distillers solubles) or synthetic (i.e., composed of simple, synthesizable organic or inorganic compounds such as ammonium salts, alkali nitrates, amino acids, urea or thiourea).

As to the energy source material, lipids, especially (1) fat acids having at least 14 carbon atoms, (2) fats or (3) mixtures thereof, are preferred. Examples of such fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids include stearic, palmitic, oleic, linoleic and myristic acids.

Other carbon-containing materials may also be used. For example such materials as glycerol, glucose, fructose, sucrose, lactose, maltose, dextrins, starches, whey, etc., are adequate carbon source materials. These materials may be used either in purified state or as concentrates, such as whey concentrate, corn, wheat or barley mash; or mixtures of the above may be employed. It is to be noted, however, that the steroid is added to the fermentation medium essentially as a precursor and not as an energy source.

The 11-ketotestololactones thus formed can then be dehydrogenated in the 1,2-position, either microbiologically, as by treatment with a known 1-dehydrogenating microorganism such as *Nocardia restrictus*, or chemically, as by treatment with selenium dioxide, or 2,3-dichloro-5,6-dicyanobenzoquinone to yield the 11-keto-1-dehydrotestololactones of this invention.

In addition to their use as intermediates, the 11-ketotestololactones of this invention, that is compounds of the general formula

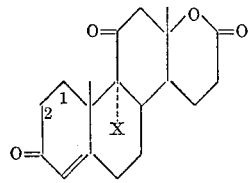

wherein the 1,2-position is saturated or double-bonded, and X is as hereinbefore defined, are physiologically active substances which possess protein-anabolic activity, and hence can be used in lieu of known protein-anabolic agents in the treatment of osteoporosis, protein tissue, depletion and chronic debility and tissue atrophy in geriatric patients, for which purpose they are administered either perorally or parenterally in the treatment of post-operative shock and other conditions where tissue degeneration has occurred, being formulated for such administration in the same type of preparations as testosterone, for example, with concentration and/or dosage based on the activity of the particular compound.

The following examples illustrate the invention (all temperatures being in centigrade):

EXAMPLE 1

*9α-fluoro-11-keto-1dehydrotestololactone and 9α-fluoro-Δ-1,4,12-13,17-seco-androstatriene-3,11-dione-17-oic acid*

Surface growth from a three-week old agar slant culture of *Cylindrocarbon radicicola* (ATCC 11011), the slant containing as a nutrient medium (A): glucose, 10 g.; Difco yeast extract, 2.5 g. $K_2HPO_4$, 1 g.; agar, 20 g.; and distilled water to 1 l., is suspended in 2.5 ml. of a 0.01% sodium lauryl sulfate aqueous solution. One milliliter portions of the suspension are used to inoculate two 250 ml. conical flasks, each containing 50 ml. of the following sterilized nutrient medium (B): dextrose, 10 g.; cornsteep liquor, 6 g.; $NH_4H_2PO_4$, 3 g.; Difco yeast extract, 2.5 g.; $CaCl_2$, 2.5 g.; and distilled water to 1 l. After 48 hours of incubation at 25° with continuous rotary agitation (280 cycles per minute, 2 inch radius), 10% (vol./vol.) transfers are made to twelve 250 ml. conical flasks each containing 50 ml. of fresh sterilized medium B. These are incubated under the conditions described above for 24 hours, after which another 10% (vol./vol.) transfer is made to 100 additional 250 ml. flasks containing 50 ml. of fresh sterilized medium B. The 9α-fluoro-11-ketoprogesterone is added by adding to each flask 0.25 ml. of a sterile solution of the steroid in N,N-dimethylformamide (60 mg./ml.) so that the medium is supplemented with 300 μg./ml. of steroid. After 48 hours of further incubation, the contents of the flasks are pooled and filtered through a Seitz clarifying pad. The flasks, mycelium and pad are washed with successive 50 ml. portions of warm water. The combined filtrate and washings (pH 8.2) are acidified to pH 4 with acetic acid and extracted three times with 2 l. portions of chloroform. The combined chloroform extracts are then washed twice with 3 l. portions of water and evaporated to dryness, in vacuo. The residue is redissolved in 200 ml. of ethyl acetate and extracted with 2 x 100 ml. portions of 5% sodium bicarbonate. The ethyl acetate is then washed with water, dried over sodium sulfate and evaporated to dryness, in vacuo. Crystallizations of the residue from acetone-hexane gives about 100 mg. of 9α-fluoro-11-keto-$\Delta^1$-dehydrotestololactone having a melting point of about 217–220°; $[\alpha]_D^{22}$ +28.5° (chlf.);

$\lambda_{max.}^{alc.}$ 234 m$\mu$ ($\epsilon$=16,000); $\lambda_{max.}^{0.05\% \text{ KOH in EtOH}}$ 241 m$\mu$ ($\epsilon$=27,000); $\lambda_{max.}^{Nujol}$ 5.80, 5.86, 6.00, 6.13, 6.22$\mu$; $E_{1/2}^{DMF}$ 1.19 volts (vs. mercury pool anode)

*Analysis.*—Calcd. for $C_{19}H_{21}O_4F$ (332.48): C, 68.66; H, 6.37. Found: C, 68.95; H, 6.12.

The sodium bicarbonate extracts are acidified with 2 N hydrochloric acid and extracted with three 100 ml. portions of chloroform. The combined chloroform extracts are then washed with water and evaporated to dryness, in vacuo. Crystallization of the residue from acetone-hexane gives about 910 mg. of 9α-fluoro-$\Delta^{1,4,12}$-13,17-seco-androstatriene-3,11-dione-17-oic acid having a melting point of about 217–220°; $[\alpha]_D^{22}$ −46.5° (chlf.);

$\lambda_{max.}^{alc.}$ 240 m$\mu$ ($\epsilon$=28,500); $\lambda_{max.}^{Nujol}$ 5.80, 6.02, 6.12, 6.24$\mu$; $E_{1/2}^{DMF}$ 1.14 volts (vs. mercury pool anode)

*Analysis.*—Calcd. for $C_{19}H_{21}O_4F$ (332.48): C, 68.66; H, 6.37. Found: C, 69.03; H, 6.21; neut. eq. 347.

EXAMPLE 2

The procedure of Example 1 is followed except that the final stage is carried out in 2 l. flasks containing 500 ml. of medium and the pH is adjusted daily with hydrochloric acid to a value slightly less than 7. The combined filtrate and washings are then extracted as described in Example 1 and separated into the acidic and neutral fractions. Crystallization of each gives respectively about 360 mg. of 9α-fluoro-$\Delta^{1,4,12}$-13,17-seco-androstatriene-3,11-dione-17-oic acid and about 510 mg. of 9α-fluoro-11-keto-$\Delta^1$-dehydrotestololactone.

EXAMPLE 3

*9α-chloro-11-keto-1-dehydrotestololactone and 9α-chloro-$\Delta^{1,4,12}$-13,17-seco-androstatriene-3,11-dione-17-oic acid*

Following the procedure of Example 1 but substituting an equivalent amount of 9α-chloro-11-ketoprogesterone for the 9α-fluoro-11-ketoprogesterone, 9α-chloro-11-keto-1-dehydrotestololactone and 9α-chloro-$\Delta^{1,4,12}$-13,17-seco-androstatriene-3,11-dione-17-oic acid are obtained.

EXAMPLE 4

*11-keto-1-dehydrotestololactone and $\Delta^{1,4,12}$-13,17-seco-androstatriene-3,11-dione-17-oic acid*

Following the fermentation and extraction procedure described in Example 1 but substituting 11-ketoprogesterone for the 9α-fluoro-11-ketoprogesterone, there is obtained about 320 mg. of 11-keto-$\Delta^1$-dehydrotestololactone having M.P. about 196–198°; $[\alpha]_D^{22}$ +79.0° (chlf.);

$\lambda_{max.}^{alc.}$ 238 m$\mu$ ($\epsilon$=15,900); $\lambda_{max.}^{0.05\% \text{ KOH in EtOH}}$ 239 m$\mu$ ($\epsilon$=25,600); $\lambda_{max.}^{Nujol}$ 5.74, 5.83, 6.00, 6.13, 6.22$\mu$

*Analysis.*—Calcd. for $C_{19}H_{22}O_4$ (314.37): C, 72.59; H, 7.05. Found: C, 72.51; H, 7.24; and about 363 mg. of $\Delta^{1,4,12}$-13,17-seco-androstatriene-3,11-dione-17-oic acid having M.P. about 167–169°; $[\alpha]_D^{22}$ ±0° (chlf.);

$\lambda_{max.}^{alc.}$ 238 m$\mu$ ($\epsilon$=29,800); $\lambda_{max.}^{Nujol}$ 5.81, 6.00, 6.02 (sh.), 6.22 (sh.), 6.24$\mu$

EXAMPLE 5

The fermentation is carried out as described in Example 1 except that 9α-bromo-11-ketoprogesterone is used as the substrate and the final stage of the fermentation is carried out in 2 l. flasks containing 500 ml. of medium. The products are separated into neutral and acidic fractions as described in Example 1 to give upon crystallization about 500 mg. of 11-keto-$\Delta^1$-dehydrotestololactone and about 200 mg. of $\Delta^{1,4,12}$-13,17-seco-androstatriene-3,11-dione-17-oic acid identical with the products of Example 4.

Similarly, 9α-iodo-11-ketoprogesterone yields 11-keto-$\Delta^1$-dehydrotestololactone and $\Delta^{1,4,12}$-13,17-seco-androstatriene-3,11-dione-17-oic acid.

EXAMPLE 6

9α-fluoro-Δ$^{1,4,12}$-13,17-seco-androstatriene-3,11-dione-17-oic acid 60 mg. of 9α-fluoro-11-keto-Δ$^1$-dehydrotestololactone is dissolved in 5 ml. of 5% potassium hydroxide in methanol and the solution is warmed on a steam bath for five minutes. It is then cooled, neutralized with acetic acid, diluted with water and extracted with ether. The ether is then re-extracted with 5% sodium bicarbonate which is acidified and extracted with ether. The ether is dried and evaporated to dryness and the residue crystallized from acetone-hexane to give 9α-fluoro-Δ$^{1,4,12}$-13,17-seco-androstatriene-3,11-dione-17-oic acid.

*Analysis.*—Calcd. for C$_{19}$H$_{21}$O$_4$F (332.48): C, 68.64; 6.37; F, 5.71. Found: C, 67.78; H, 6.81; F, 5.67.

EXAMPLE 7

Δ$^{1,4,12}$-13,17-seco-androstatriene-3,11-dione-17-oci acid

Following the procedure of Example 6, but substituting an equivalent amount of 11-keto-Δ$^1$-dehydrotestololactone for the 9α-fluoro-11-keto-Δ$^1$-dehydrotestololactone, Δ$^{1,4,12}$-13,17-seco-androstatriene-3,11-dione-17-oic acid is obtained.

EXAMPLE 8

Methyl 9α-fluoro-Δ$^{1,4,12}$-13,17-seco-androstatriene-3,11-dione-17-oate

To a suspension of 360 mg. of 9α-fluoro-Δ$^{1,4,12}$-13,17-seco-androstatriene-3,11-dione-17-oic acid in 10 ml. of methanol, an ethereal solution of diazomethane is added slowly with swirling until the steroid dissolved and the yellow color of the diazomethane persists. After 30 minutes at room temperature the solution is evaporated, in vacuo, and the residue distributed between ethyl acetate and 5% sodium bicarbonate. The ethyl acetate is washed well with water, dried over sodium sulfate and evaporated to dryness, in vacuo. Chromatography of the residue on Woelm neutral alumina and elution with chloroform-benzene (1:9) gives on crystallization from acetone-hexane about 200 mg. of methyl 9α-fluoro-Δ$^{1,4,12}$-13,17-seco-androstatriene-3,11-dione-17-oate, melting point about 119–121°; [α]$_D^{23}$ —46.9° (chlf.);

$\lambda_{max.}^{alc.}$ 239 mμ ($\epsilon$=29,400); $\lambda_{max.}^{Nujol}$ 5.80, 5.96–6.01, 6.12, 6.21μ

*Analysis.*—Calcd. for C$_{20}$H$_{23}$O$_4$F (346.38): C, 69.34; H, 6.69; F, 5.49. Found: C, 69.50; H, 7.09; F, 5.53.

EXAMPLE 9

Methyl Δ$^{1,4,12}$-13,17-seco-androstatriene-3,11-dione-17-oate

Following the procedure of Example 8, but substituting an equivalent amount of Δ$^{1,4,12}$-13,17-seco-androstatriene-3,11-dione-17-oic acid for the 9α-fluoro steroid, methyl Δ$^{1,4,12}$-13,17-seco-androstatriene-3,11-dione-17-oate is obtained.

EXAMPLE 10

9α-fluoro-11-ketotestololactone

Following the fermentation and extraction procedures described in Example 1 but substituting a culture of *Penicillium citrinum* (ATCC 8506) for the *C. radicicola* there is obtained on crystallization of the neutral fraction about 667 mg. of 9α-fluoro-11-ketotestololactone, M.P. about 193–195°; [α]$_D^{23}$ +59.4° (chlf.);

$\lambda_{max.}^{alc.}$ 233 mμ ($\epsilon$ =17,400); $\lambda_{max.}^{Nujol}$ 5.77, 6.00, 6.17μ

Similarly, 9α-chloro-11-ketoprogesterone yields 9α-chloro-11-ketotestololactone.

EXAMPLE 11

11-ketotestololactone

Following the fermentation and extraction procedures described in Example 1 but substituting *Penicillium citrinum* (ATCC 8506) for *C. radicicola* and 11-ketoprogesterone for 9α-fluoro-11-ketoprogesterone there is obtained about 650 mg. of 11-ketotestololactone having a melting point of about 226–228°, [α]$_D^{22}$ +121° (chlf.);

$\lambda_{max.}^{alc.}$ 237 mμ ($\epsilon$ =17,200); $\lambda_{max.}^{0.01\ N\ KOH\ in\ MeOH}$ 238 mμ ($\epsilon$ = 27,400); $\lambda_{max.}^{Nujol}$ 5.81, 5.84, 6.00, 6.17μ

*Analysis.*—Calcd. for C$_{19}$H$_{24}$O$_4$ (316.38): C, 72.12; H, 7.65. Found: C, 72.26; H, 7.77.

EXAMPLE 12

9α-fluoro-11-keto-Δ$^1$-dehydrotestololactone

The fermentation is carried out as described in Example 1, however, a culture of *Nocardia restrictus* (Culture Collections, Rutgers Institute of Microbiology, No. 545) is substituted for the *C. radicicola* and 200 mg. of 9α-fluoro-11-ketotestololactone is used as the substrate and distributed in twenty 250 ml. flasks. The fermentation is allowed to proceed for 7½ hours, then filtered and washed with water and the combined filtrate and washing (1.1 l.) extracted three times with 300 ml. portions of chloroform. The chloroform extracts are combined, washed with water and evaporated to dryness, in vacuo. Crystallization of the residue from acetone-hexane gives about 100 mg. of 9α-fluoro-11-keto-Δ$^1$-dehydrotestololactone.

Similarly, 9α-chloro-11-ketotestololactone yields 9α-chloro-11-keto-Δ$^1$-dehydrotestololactone.

EXAMPLE 13

11-keto-Δ$^1$-dehydrotestololactone

Following the procedure described in Example 12 but substituting 11-ketotestololactone for 9α-fluoro-11-ketotestololactone there is obtained 11-keto-Δ$^1$-dehydrotestololactone.

This invention may be variously otherwise embodied within the scope of the appended claims.

What is claimed is:

1. 9α-fluoro-Δ$^{1,4,12}$-13,17 - seco-androstatriene - 3,11-dione-17-oic acid.
2. Methyl 9α-fluoro-Δ$^{1,4,12}$-13,17-seco-androstatriene-3,11-dione-17-oate.
3. 9α-fluoro-11-keto-1-dehydrotestololactone.
4. 9α-fluoro-11-ketotestololactone.
5. 9α-chloro-11-keto-Δ$^1$-dehydrotestololactone.
6. 9α-chloro-11-keto-testololactone.
7. A compound of the formula

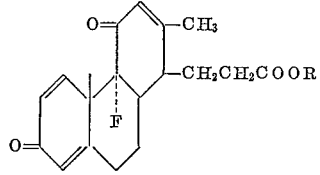

wherein R is selected from the group consisting of hydrogen and an unsubstituted hydrocarbon radical of less than ten carbon atoms.

8. A compound of the formula

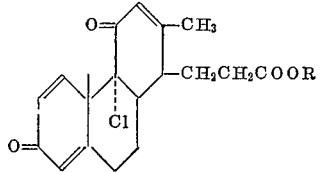

wherein R is selected from the group consisting of hydrogen and an unsubstituted hydrocarbon radical of less than ten carbon atoms.

(References on following page)

References Cited by the Examiner

UNITED STATES PATENTS

| | | | |
|---|---|---|---|
| 2,755,289 | 7/56 | Picha | 260—343.2 |
| 2,760,966 | 8/56 | Knowles | 260—343.2 |
| 2,806,038 | 9/57 | Picha | 260—343.2 |
| 2,837,464 | 6/58 | Nobile | 260—343.2 |
| 2,851,485 | 8/58 | Bible | 260—514.5 |
| 2,888,384 | 5/59 | Murray et al. | 195—51 |
| 2,946,807 | 7/60 | Fried et al. | 260—343.2 |
| 2,955,075 | 10/60 | Thoma et al. | 195—51 |
| 2,983,754 | 5/61 | Wendler | 260—514.5 |

FOREIGN PATENTS 792,803   4/58   Great Britain.

OTHER REFERENCES

Fieser et al.: Steroids, Reinhold Publ. Co., New York (1959), page 475.

Fieser et al.: Steroids, Reinhold Publ. Corp., New York (1959), pages 592 and 593.

Herr et al.: Jour. Amer. Chem. Soc., vol. 78, pages 500 and 501.

IRVING MARCUS, *Primary Examiner*.

NICHOLAS S. RIZZO, *Examiner*.